United States Patent
Frimberger et al.

(10) Patent No.: US 6,766,235 B2
(45) Date of Patent: Jul. 20, 2004

(54) METHOD AND APPARATUS FOR DETERMINING DEPLOYMENT OF A SAFETY RESTRAINT DEVICE IN AN OCCUPANT RESTRAINING SYSTEM

(75) Inventors: Manfred Frimberger, Ergoldsbach (DE); Telmo Glaser, Regensburg (DE); Jeffrey Gleacher, West Bloomfield, MI (US); Reinhard Hamperl, Koefering (DE); Matthias Kiening, Bad Abbach (DE); Douglas McConnell, Rochester Hills, MI (US); Reinhart Weber, Regensburg (DE)

(73) Assignee: Seimens VDO Automotive Corporation, Auburn Hills, MI (US)

( * ) Notice: Subject to any disclaimer, the term of this patent is extended or adjusted under 35 U.S.C. 154(b) by 27 days.

(21) Appl. No.: 10/349,721

(22) Filed: Jan. 23, 2003

(65) Prior Publication Data

US 2003/0139866 A1 Jul. 24, 2003

Related U.S. Application Data

(60) Provisional application No. 60/353,602, filed on Jan. 23, 2002.

(51) Int. Cl.⁷ .............................................. B60R 21/32
(52) U.S. Cl. ........................................ 701/45; 280/735
(58) Field of Search .............................. 701/38, 45, 46, 701/41, 47; 280/734, 735; 180/282

(56) References Cited

U.S. PATENT DOCUMENTS

| | | |
|---|---|---|
| 5,394,328 A | 5/1995 | Huang |
| 5,793,121 A | 8/1998 | Burgess |
| 5,797,111 A | 8/1998 | Husby |
| 6,052,634 A * | 4/2000 | Pathe et al. .................... 701/45 |
| 6,123,357 A * | 9/2000 | Hosoda et al. ................. 701/45 |
| 6,244,095 B1 | 6/2001 | Masami |
| 6,460,882 B1 * | 10/2002 | Andres ........................ 280/735 |
| 6,560,519 B2 * | 5/2003 | Williams et al. .............. 701/45 |
| 6,643,575 B2 * | 11/2003 | Ishida et al. .................. 701/45 |

FOREIGN PATENT DOCUMENTS

| | | |
|---|---|---|
| DE | 44 25 846 A | 1/1996 |
| DE | 199 09 296 A | 9/2000 |
| GB | 2 292 126 A | 2/1996 |
| JP | 7-165011 * | 6/1995 |
| WO | WO 01 94158 A | 12/2001 |
| WO | WO 02 04257 A | 1/2002 |

OTHER PUBLICATIONS

International Search Report, dated Oct. 3, 2003.

* cited by examiner

*Primary Examiner*—Richard M. Camby

(57) ABSTRACT

A vehicle occupant restraining system includes a plurality of safety restraint devices and utilizes a main controller and a safing controller to determine whether or not conditions are proper for deploying each safety restraint device. The system discriminates between front, side, rear, and roll-over impact events and determines which safety restraint devices should be deployed in response to an impact event. The system also independently determines whether to activate a fuel cut-off switch in response to an impact event. The main and safing controllers utilize vehicle data from a main center tunnel sensor assembly and various satellite sensors to make deployment decisions. The safing controller is used to independently verify whether or not the safety restraint should be deployed.

29 Claims, 5 Drawing Sheets

METHOD AND APPARATUS FOR DETERMINING DEPLOYMENT OF A SAFETY RESTRAINT DEVICE IN AN OCCUPANT RESTRAINING SYSTEM

CROSS-REFERENCE TO RELATED APPLICATIONS

The application claims priority to U.S. Provisional Application No. 60/353,602, which was filed on Jan. 23, 2002.

BACKGROUND OF THE INVENTION

This invention relates to a method and apparatus for determining whether conditions are proper for deploying a safety restraint device in a vehicle occupant restraining system.

Vehicle occupant restraining systems utilize various different safety restraint devices, such as airbags, to prevent passengers from experiencing severe injuries in the event of a vehicle crash. The airbags can be located at different locations within the vehicle, such as in the steering wheel, dashboard, or door panels, for example.

In response to a vehicle crash, a central controller determines which of the safety restraint devices should be deployed and also determines whether the crash conditions are sufficient to warrant deployment. To make this decision, the central controller analyzes data from many different vehicle sensors. These sensors can include accelerometers, roll angular rate sensors, and crash sensors, for example.

One disadvantage with this system is that if the central controller is experiencing problems, improper deployment decisions could be made. For example, the central controller could decide to deploy an airbag in a situation where a deployment is undesirable or could fail to issue a deployment command when an airbag should be deployed. The central controller may not be operating properly for various different reasons. There could be problems with the sensors, which could result in a fault or non-receipt of data error. In this situation, the central controller may not have sufficient data to make a decision. Or, there could be a problem with the central controller itself, in which case the central controller may not be able to process the steps in an efficient and accurate manner to generate the proper control signal.

Thus, it is desirable to have a method and apparatus that can verify whether or not deployment of the safety restraint device is proper, as well as overcoming the other above mentioned deficiencies with the prior art.

SUMMARY OF THE INVENTION

A vehicle occupant restraining system includes a plurality of safety restraint devices and utilizes a main controller and a safing controller to determine which safety restraint devices should be deployed, and further determines whether or not conditions are proper for deployment. The system discriminates between front, side, rear, and roll-over impact events and independently determines whether to activate a fuel cut-off switch in response to an impact event. The main and safing controllers utilize vehicle data from a main center tunnel sensor assembly and various satellite sensors to make deployment decisions. The safing controller is used to independently verify whether or not the safety restraint should be deployed.

In one disclosed embodiment, the main center tunnel sensor assembly includes a longitudinal sensor for generating a longitudinal sensor signal, a lateral sensor for generating a lateral sensor signal, and a vertical sensor for generating a vertical sensor signal. The satellite sensor assembly includes at least one front impact sensor for generating a front impact sensor signal and a plurality of side impact sensors, positioned at various different locations on the sides of the vehicle, for generating a plurality of side impact sensor signals. The satellite sensor assembly also preferably includes at least one rear impact sensor for generating a rear impact sensor signal.

In a front impact event, the main controller determines whether to deploy a front impact related safety restraint device via primary and secondary safing actuators. The main controller generates an arming threshold based on the longitudinal sensor signal or the front impact sensor signal and subsequently generates a safety restraint device deployment request based on the longitudinal sensor signal and the front impact sensor signal. The safing controller generates a deployment decision for front impact related safety restraint devices based on the longitudinal sensor signal. The safing controller does this independently of the arming threshold and safety restraint device deployment request as generated by the main controller. The primary and secondary safing actuators are enabled only after the deployment decision for front impact related safety restraint devices and the arming threshold have been generated. The front impact related safety restraint devices are deployed in response to the primary and secondary safing actuators being enabled in combination with the safety restraint device deployment request being generated. Preferably, the primary safing actuator comprises a transistor switch and the secondary safing actuator comprises a deployment enable signal that enables activation components necessary for the deployment of the associated safety restraint devices, with the exception of the primary safing actuator.

In a side impact event, the main controller determines whether to deploy a side impact related safety restraint device via primary and secondary safing actuators. The main controller generates an arming threshold based on at least one of the side impact sensor signals and subsequently generates a safety restraint device deployment request based on either the longitudinal sensor signal and at least one of the side impact sensor signals, the lateral sensor signal and at least one of the side impact sensor signals, or at least two side impact sensor signals. The safing controller generates a deployment decision for side impact related safety restraint devices based on at least one of the side impact sensor signals. The safing controller does this independently of the arming threshold and safety restraint device deployment request as generated by the main controller. The primary and secondary safing actuators are enabled only after the deployment decision for side impact related safety restraint devices and the arming threshold have been generated. The side impact related safety restraint devices are deployed in response to the primary and secondary safing actuators being enabled in combination with the safety restraint device deployment request being generated. The primary and secondary safing actuators operate similarly to that described above.

In a rear impact event, the main controller determines whether to deploy a rear impact related safety restraint device via primary and secondary safing actuators. The main controller generates an arming threshold based on the longitudinal sensor signal or the rear impact sensor signal and subsequently generates a safety restraint device deployment request based on the longitudinal sensor signal and the rear impact sensor signal. The safing controller generates a deployment decision for rear impact related safety restraint devices based on the longitudinal sensor signal. The safing controller does this independently of the arming threshold and safety restraint device deployment request as generated by the main controller. The primary and secondary safing actuators are enabled only after the deployment decision for rear impact related safety restraint devices and the arming threshold have been generated. The rear impact related safety restraint devices are deployed in response to the primary and secondary safing actuators being enabled in combination with the safety restraint device deployment request being generated. Preferably, the primary and secondary safing actuators operate as described above.

In one disclosed embodiment, the main sensor assembly includes a roll angular rate sensor for generating a roll angular rate signal. In a roll-over impact event, the main controller determines whether to deploy a roll-over impact related safety restraint device with primary and secondary safing actuators. The main controller generates an arming threshold based on the roll angular rate sensor signal or the lateral sensor signal and subsequently generates a safety restraint device deployment request based on the roll angular rate sensor signal and the lateral sensor signal or the vertical sensor signal. The safing controller generates a deployment decision for roll-over impact related safety restraint devices based on the roll angular rate sensor signal. The safing controller does this independently of the arming threshold and safety restraint device deployment request as generated by the main controller. The primary and secondary safing actuators are enabled only after the deployment decision for roll-over impact related safety restraint devices and the arming threshold have been generated. The roll-over impact related safety restraint device is deployed in response to the primary and secondary safing actuators being enabled in combination with the safety restraint device deployment request being generated. The primary and secondary safing actuators operate similarly to that described above.

In one disclosed embodiment, the main controller determines whether to generate a fuel-cut-off signal in response to an impact event. The main controller determines whether to generate the fuel cut-off signal independently from the safety restraint device deployment decisions. The main controller compares the lateral and longitudinal sensor signals to a predetermined threshold and generates the fuel cut-off signal if a sum of the lateral and longitudinal sensor signals exceeds a first static threshold. The main controller discriminates between roll-over, front, side, and rear impact events before generating the fuel cut-off signal and compares the sum of the lateral and longitudinal sensor signals to a second static threshold, lower than the first static threshold. If the second static threshold is exceeded, the main controller determines a velocity direction of the longitudinal sensor signal and activates a fuel cut-off switch if the velocity direction indicates a rear impact event.

The subject system and method provides a more accurate and efficient method for determining whether or not conditions are proper for safety restraint deployment by utilizing independent deployment verification. These and other features of the present invention can be best understood from the following specifications and drawings, the following of which is a brief description.

DETAILED DESCRIPTION OF A PREFERRED EMBODIMENT

Figure 1:
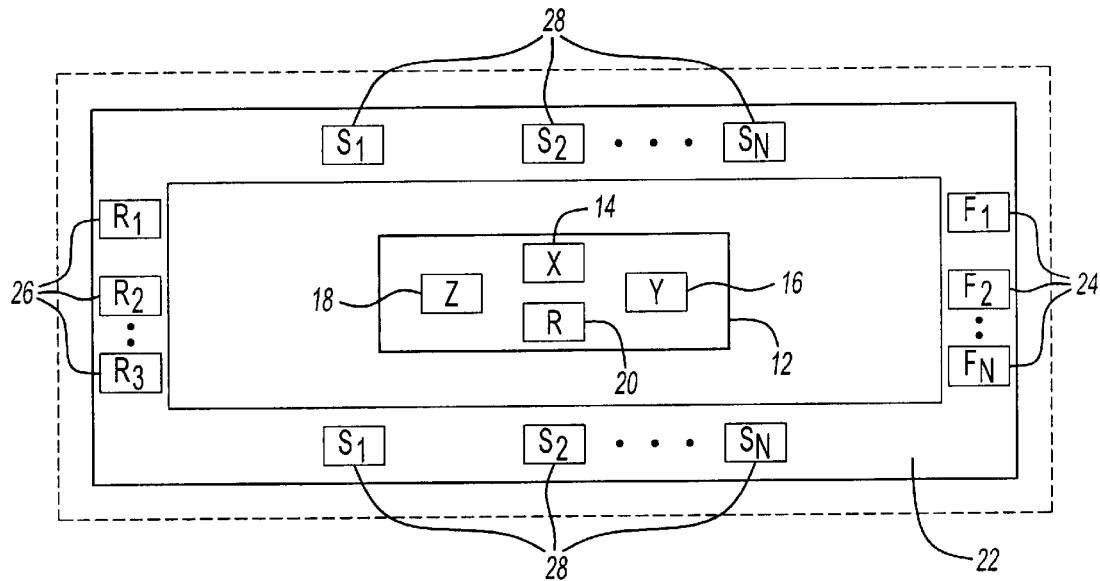
FIG. 1 is a schematic view of a vehicle incorporating a center tunnel sensor assembly and a satellite sensor assembly.

A schematic diagram of a vehicle with an occupant restraining system is shown in FIG. 1. The vehicle includes a main or center tunnel sensor assembly 12 that is used to measure various vehicle characteristics as occurring near the center of the vehicle. The main sensor assembly includes an X sensor 14 for measuring longitudinal velocity or acceleration, a Y sensor 16 for measuring lateral velocity or acceleration, a Z sensor 18 for measuring vertical velocity or acceleration, and a R sensor 20 for measuring roll angular rate. It should be understood that any known sensor in the art can be used and that the sensors 14, 16, 18, 20 can be packaged together in various combinations or can be individually mounted.

A satellite sensor assembly 22 is used to measure vehicle characteristics as occurring at satellite vehicle locations, i.e., vehicle locations remotely positioned relative to the center of the vehicle. The satellite sensor assembly includes at least one front impact sensor 24 for measuring longitudinal accelerations, at least one rear impact sensor 26 for measuring longitudinal accelerations, and a plurality of side impact sensors 28 for measuring lateral accelerations. It should be understood that the satellite sensors 22 can be any known sensor in the art and can include multiple front, rear, and side impact sensors positioned at various locations throughout the vehicle.

Figure 2:
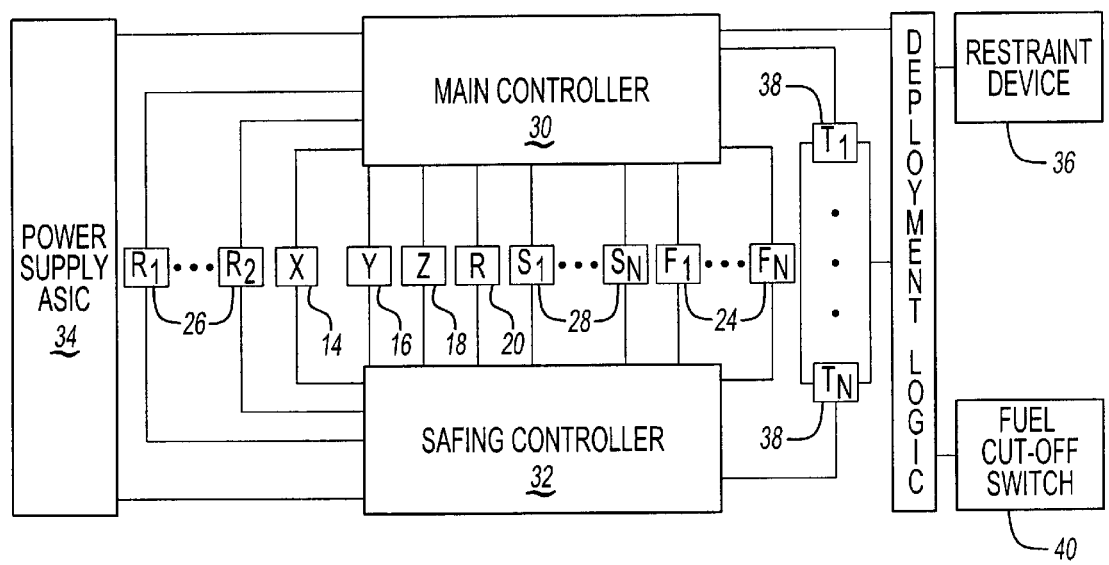
FIG. 2 is a schematic view of an occupant restraining control system incorporating the subject invention.

A shown in FIG. 2, the X sensor 14, Y sensor 16, Z sensor 18, and R sensor 20 each transmit signals to a main controller 30 and a safing controller 32 that operates independently from the main controller. The front impact sensors 24, rear impact sensors 26, and side impact sensors 28 also each transmit signals to the main 30 and safing 32 controllers. The main 30 and safing 32 controllers are micro controllers powered by a power supply 34.

The main controller 30 utilizes sensor data to determine whether or not conditions are proper for deployment of a safety restraint device 36, such as an airbag, for example. Preferably, the safety restraint device comprises a plurality of airbags positioned at various locations throughout the vehicle, however, other safety restraint devices known in the art could also be used in place of, or in addition to, the airbags. Primary and secondary safing actuators 38 are used to activate the appropriate safety restraint components, i.e. hardware and/or software, under the appropriate conditions, which vary depending on whether there is a front, rear, side, or roll-over impact event. The primary and secondary safing actuators 38 can be switches, control signals, serial communications, or other similar devices and/or commands.

Preferably, the primary safing actuator is a transistor switch and the secondary safing actuator is a deployment enable signal that enables the appropriate activation means necessary for the deployment of the safety restraint device, with the exception of the primary safing actuator.

In one disclosed embodiment, the primary safing actuator comprises the transistor switch and the secondary safing actuator comprises a firing loop enable pin (FLEN) for an application specific integrated circuit (ASIC). However, as discussed above, other switching or similar mechanisms could be used in place of the transistor switch. Further, deployment enable signals and serial communications can also be used instead of a FLEN.

The main controller 32 independently determines whether or not to energize a fuel cut-off switch 40. The method for determining when the safety restraint 36 should be deployed and when the fuel cut-off switch 40 should be energized will be explained in greater detail below. The operation and structure of airbag and fuel cut-off switch components is well known and will not be discussed in any further detail.

The method for determining deployment of a safety restraint device includes the following steps. Vehicle characteristics that occur near the center of the vehicle body are measured by the main sensor assembly, which in turn generates a plurality of central vehicle characteristic signals. Vehicle characteristics as occurring at locations in the vehicle body that are remote from the central location are measured by the satellite sensor assembly 22, which in turn generates a plurality of satellite vehicle characteristic signals. Both the central vehicle characteristic signals and satellite vehicle characteristic signals are sent to the main controller 30 and the safing controller 32. The main controller 30 determines whether conditions are proper for deployment of the safety restraint device 36 in response to a vehicle impact event. The safing controller 32 is used to verify whether conditions are proper for deployment of the safety restraint device. Thus, the main 30 and safing 32 controllers make deployment decisions independently from each other with the safing controller 32 being used to improve deployment decision accuracy.

As discussed above, the main sensor assembly 12 measures a longitudinal vehicle characteristic and generates a longitudinal data signal via the X sensor 14. The main sensor assembly 12 measures a lateral vehicle characteristic and generates a lateral data signal via the Y sensor 16. The main sensor assembly 12 measures a vertical vehicle characteristic and generates a vertical signal via the Z sensor 18. Finally, the main sensor assembly 12 measures a roll angular rate and generates a roll angular rate signal via the R sensor 20.

Also as discussed above, the satellite sensor assembly 22 measures a front crash vehicle characteristic and generates a front crash data signal via the front impact sensor 24. The satellite sensor assembly 22 measures a plurality of side crash vehicle characteristics and generates a plurality of side crash data signals via the side impact sensors 28. Finally, the satellite sensor assembly measures a rear crash vehicle characteristic and generates a rear crash data signal via the rear impact sensor 26.

Figure 3:
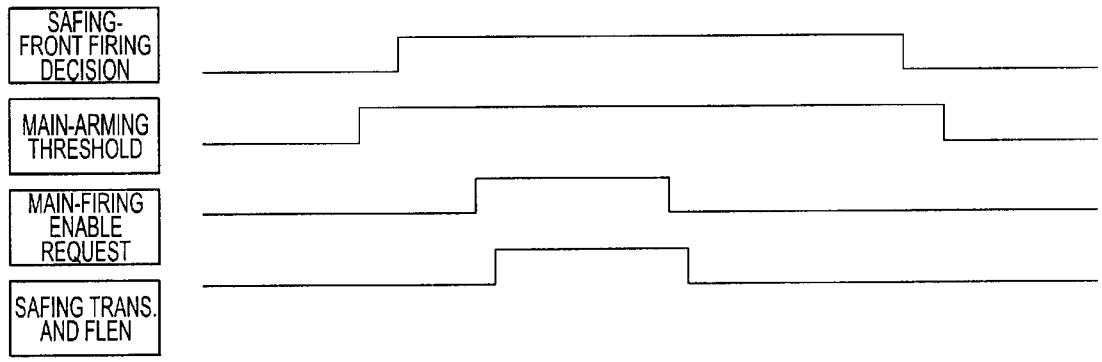
FIG. 3 is a timing diagram for front deployment.

FIG. 3 shows a timing diagram for the main 30 and safing 32 controllers in the event of a front impact. First, the main controller 30 generates an arming threshold based on the longitudinal data signal or the front crash data signal. Next, the main controller 30 generates a safety restraint device deployment request based on the longitudinal data signal and the front crash data signal. An example of the safety restraint device deployment request would be a front firing enable request for a safety restraint device operable during frontal impact crash events. The safing controller 32 generates a deployment decision for front impact related safety restraint devices based on the longitudinal data signal. The sating controller 32 generates the deployment decision independent from the arming threshold and safety restraint device deployment request generated by the main controller. The appropriate primary and secondary sating actuators 38 are enabled once both the arming threshold and deployment decision steps have been completed. The appropriate front impact related safety restraint devices 36 are deployed when the safety restraint device deployment request and enablement of the safing actuator steps have been completed.

The timing diagram for the main 30 and safing 32 controllers, in the event of a rear impact, operate in a manner similar to that shown in FIG. 3. First, the main controller 30 generates an arming threshold based on the longitudinal data signal or the rear crash data signal. Next, the main controller 30 generates a rear safety restraint device deployment request based on the longitudinal data signal and the rear crash data signal. The safing controller 32 generates a deployment decision for rear impact related safety restraint devices based on the longitudinal data signal. The safing controller 32 generates the deployment decision independent from the arming threshold and safety restraint device deployment request generated by the main controller 30. The appropriate primary and secondary sating actuators 38 are enabled once both the arming threshold and deployment decision steps have been completed. The appropriate rear impact related safety restraint devices 36 are deployed when the safety restraint device deployment request and enablement of the sating actuator steps have been completed.

Figure 4:
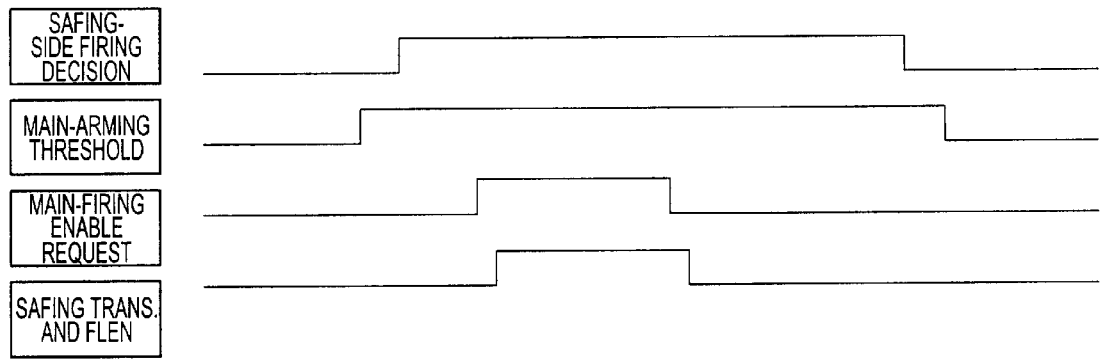
FIG. 4 is a timing diagram for side deployment.

FIG. 4 shows a timing diagram for the main 30 and safing 32 controllers in the event of a side impact. The main controller generates an arming threshold based on at least one of the side crash data signals. Next, the main controller generates a side safety restraint device deployment request based on either at least one of the side crash data signals and the longitudinal data signal, at least one of the side crash data signals and the lateral data signal, or two side crash data signals. The safing controller 32 generates a deployment decision for side impact related safety restraint devices based on the side crash data signal. The primary and secondary safing actuators 38 are enabled once both the arming threshold and deployment decision steps have been completed. The appropriate side impact related safety restraint devices 36 are deployed when the safety restraint device deployment request and enablement of the safing actuator steps have been completed.

Figure 5:
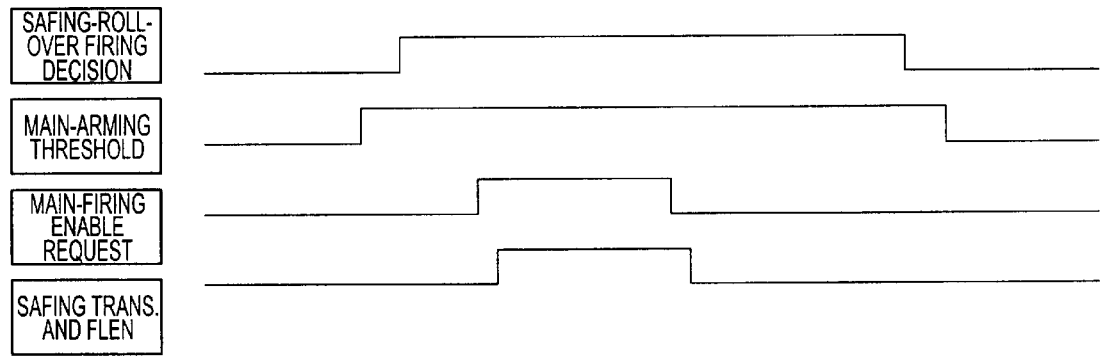
FIG. 5 is a timing diagram for roll-over deployment.

FIG. 5 shows a timing diagram for the main 20 and safing 32 controllers in response to a roll-over event. The main controller 30 generates an arming threshold based on the roll angular rate data signal or the lateral data signal and then generates a safety restraint device deployment request based on the roll angular rate data signal and the lateral data signal or the vertical data signal. The safing controller 32 generates a deployment decision for roll-over impact related safety restraint devices based on the roll angular rate data signal. The appropriate primary and secondary safing actuators 38 are enabled once both the arming threshold and deployment decision steps have been completed. The appropriate roll-over impact related safety restraint devices 36 are deployed when the safety restraint device deployment request and enablement of the safing actuator steps have been completed.

The main 30 and safing 32 controllers go through a start-up phase after any main controller reset. Further, sensor tests are completed to determine whether or not the sensors are operating as required. After the sensor tests are completed, the main controller 30 is allowed to finish the start-up phase and go into a normal mode, which means that safing transistor, high side, FLEN, or other similar tests do not need to be completed. In the situation where the start-up tests are interrupted, the main controller 30 can re-enter the start-up phase at any time.

The safing controller 32 allows normal mode operation only after the sensor tests are finished. The safing controller 32 allows high side, safing transistor, FLEN, and other similar tests in the start-up phase without any time limitation or special order. Preferably, the only time limitation checked by the safing controller 32 is the time after the sensor tests are finished. If the safing controller 32 has passed its sensor tests once, it does not check any further sensor test output data. Once the start-up phase has been completed satisfactorily, both the main 30 and safing 32 controllers are placed in normal mode operation.

Once the main 30 and safing 32 controllers are in normal mode operation, their respective algorithms are activated. As shown in FIG. 3, for a front deployment of a front impact related safety restraint device, the main controller 30 has to send the arming threshold and firing threshold signals one after the other or simultaneously. Further, for activation of deployment, the safing controller 32 must make a deployment or firing decision. If the arming threshold and firing threshold signals and the safing controller firing decision are active simultaneously, the safing controller 32 releases front deployment. The safing controller 32 disables the deployment after the deployment or firing front request is inactive. If the safing controller 32 sees a firing front request without an active arming threshold, it indicates an error of a wrong state transition. The rear deployment process operates similarly to that of the front deployment process. The side deployment process and roll-over deployment processes of FIGS. 4 and 5 operate in a similar manner.

If the safing controller 32 has indicated either a main or safing system error, alarm mode is activated and the safing controller 32 disables all the firing enable requests and safing actuators within a predetermined time limit. Depending on the type of error, the system can be reset or may require additional service.

The main controller 30 also determines whether to generate a fuel-cut-off signal in response to an impact event independently from the determination of whether safety restraint device deployment conditions are proper. As shown in the graphs of FIGS. 6–10, the main controller compares the lateral and longitudinal data signals to a predetermined threshold and generates the fuel cut-off signal if the sum of the lateral and longitudinal data signals exceeds a first static threshold.

The main controller 30 discriminates between roll-over, front, side, and rear impact events before generating the fuel cut-off signal. The main controller 30 then compares the sum of the lateral and longitudinal data signals to a second static threshold, which is lower than the first static threshold. If the second static threshold is exceeded, the main controller 30 determines whether the impact event is a rear impact. The main controller 30 determines this by determining a velocity direction of the longitudinal data signal. The fuel cut-off switch 40 is activated or energized if the velocity direction indicates a rear impact event.

Figure 6:
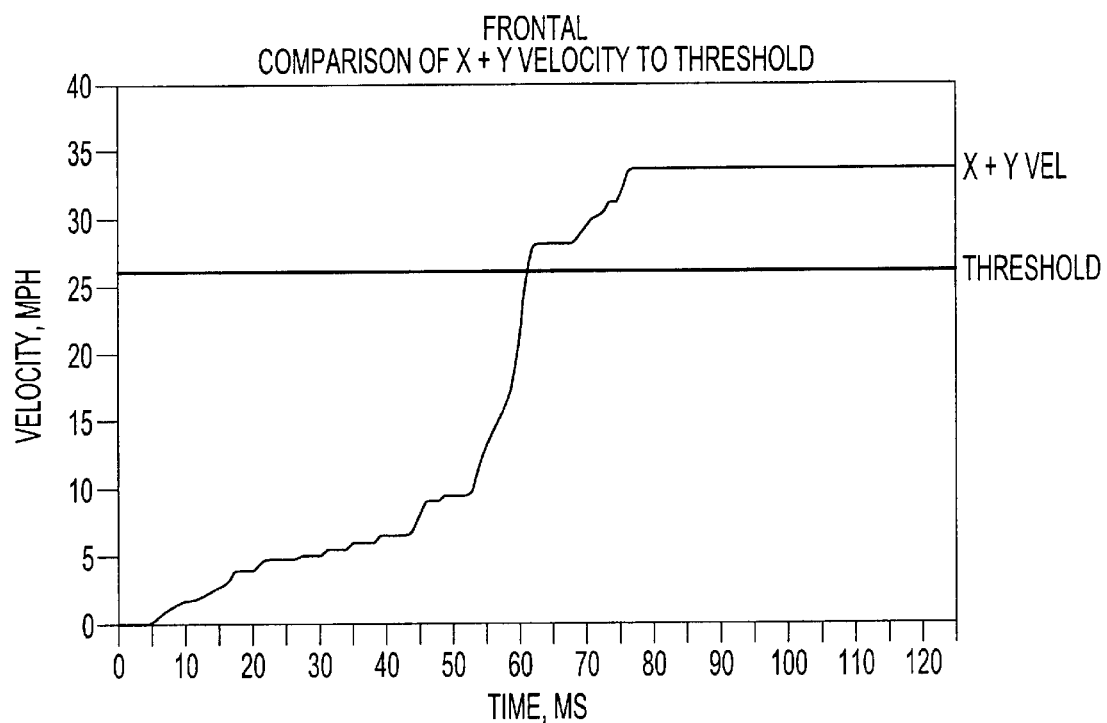
FIG. 6 is a fuel cut-off Velocity v. Time graph of a X+Y velocity compared to a threshold for a frontal impact.

FIG. 6 shows a fuel cut-off Velocity v. Time graph of a X+Y velocity compared to a threshold slightly greater than 25 mph for a frontal impact. As shown in the graph, the X+Y velocity exceeds the threshold at about 60 ms, which is sufficient time for the main controller 30 to determine whether to activate the fuel cut-off switch. Preferably, the main controller 30 determines whether to activate the fuel cut-off switch within 200 ms.

Figure 7:
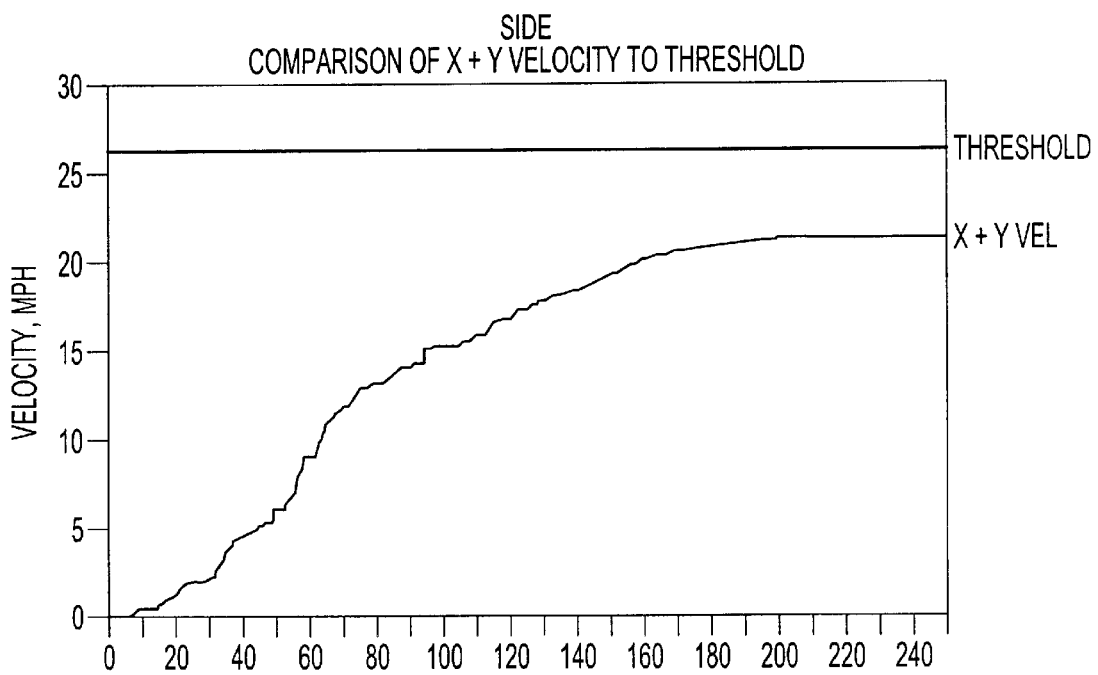
FIG. 7 is a fuel cut-off Velocity v. Time graph of a X+Y velocity compared to a threshold for a side impact.

FIG. 7 is a fuel cut-off Velocity v. Time graph of a X+Y velocity compared to a threshold for a side impact. In this example, the X+Y velocity does not exceed the threshold even after 200 ms.

Figure 8:
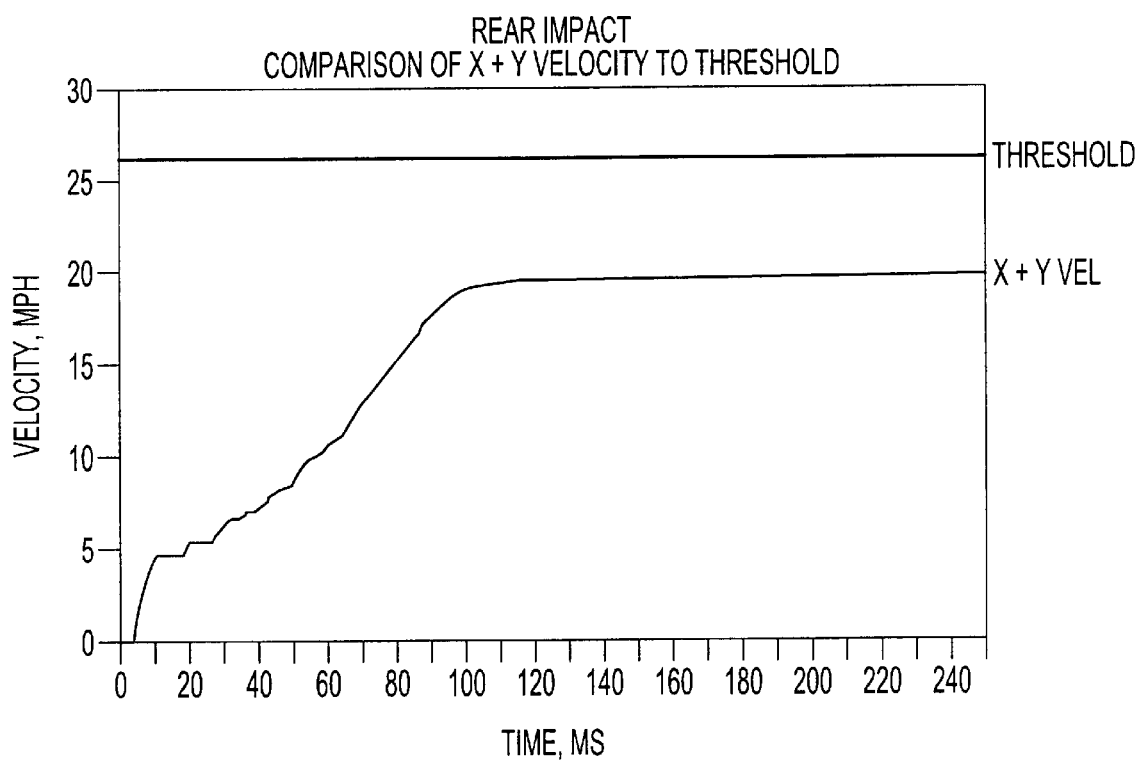
FIG. 8 is a fuel cut-off Velocity v. Time graph of a X+Y velocity compared to a threshold for a rear impact.

FIG. 8 is a fuel cut-off Velocity v. Time graph of a X+Y velocity compared to a threshold for a rear impact. In this example, the X+Y velocity does not exceed the threshold even after 200 ms.

Figure 9:
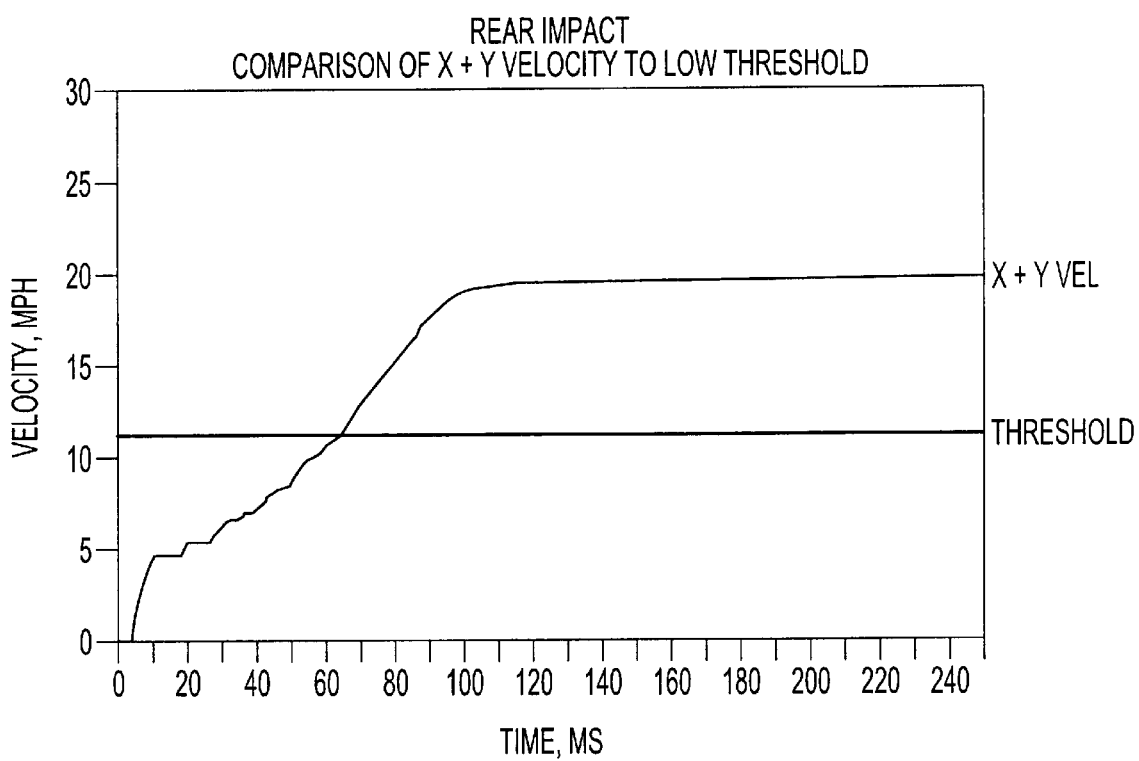
FIG. 9 is a fuel cut-off Velocity v. Time graph of a X+Y velocity compared to a lower threshold for a rear impact.

FIG. 9 is a fuel cut-off Velocity v. Time graph of a X+Y velocity compared to a lower threshold for a rear impact. In this example, the lower threshold is set at just over 10 mph. At approximately 60 ms, the X+Y velocity exceeds the threshold.

Figure 10:
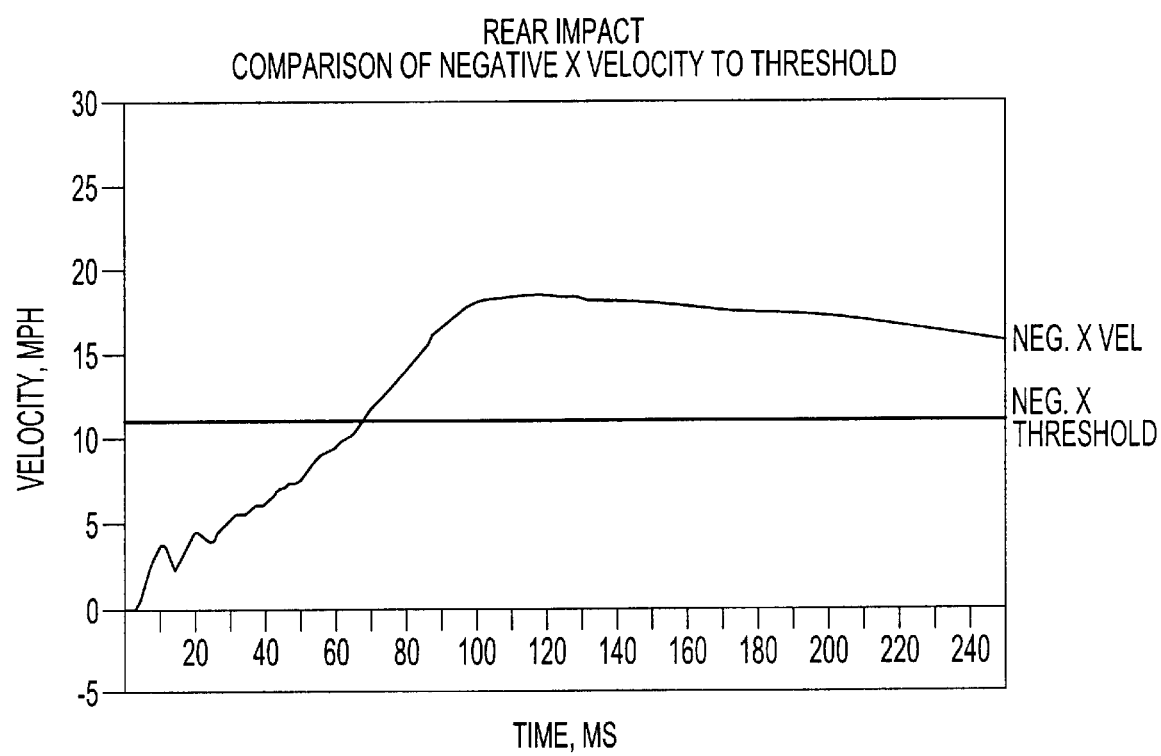
FIG. 10 is a fuel cut-off Velocity v. Time graph of a negative X velocity compared to a negative x threshold for a rear impact.

FIG. 10 is a fuel cut-off Velocity v. Time graph of a negative X velocity compared to a negative X threshold for a rear impact. In this example, the lower threshold is set at just over 10 mph. At approximately 70 ms, the negative X velocity exceeds the threshold.

The subject method for determining whether or not to generate a fuel cut-off signal is advantageous because there is discrimination between front, side, and rear impact events and existing safety restraint hardware is used, which reduces cost. Further, the determination is made independently from the main algorithm.

The fuel cut-off determination method is initiated when the X or Y velocity (and any associated offset) exceeds a threshold. The cut-off signal is determined as a sum of the X and Y velocities and is compared to the static threshold. If the signal exceeds the threshold, the switch 40 is energized.

As discussed above, a second step is required to further discriminate soft rear impact events. In this step the sum of the X and Y velocities is compared to a lower static threshold and if the signal exceeds the lower threshold, the main controller 30 determines the direction of the X velocity. If the direction indicates a rear event then the fuel supply is cut off.

By utilizing a safing controller to verify deployment decisions made by a main controller, the subject invention provides an occupant restraining system that makes more accurate deployment decisions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An apparatus for determining deployment of a safety restraint device in a vehicle occupant restraining system comprising:

a main sensor assembly for measuring vehicle characteristics as occurring near a central location in a vehicle body wherein said main sensor assembly generates a plurality of central vehicle characteristic signals;

a satellite sensor assembly for measuring vehicle characteristics as occurring at locations in the vehicle body that are remote from said central location wherein said satellite sensor assembly generates a plurality of satellite vehicle characteristic signals;

a main controller for receiving said plurality of central vehicle characteristic signals and said plurality of satellite vehicle characteristic signals and in response to a vehicle impact event using said plurality of central vehicle characteristic signals and said plurality of satellite vehicle characteristic signals to determine whether conditions are proper for deployment of a safety restraint device; and a safing controller for receiving said plurality of central vehicle characteristic signals and said plurality of satellite vehicle characteristic signals wherein said safing controller communicates with said main controller to verify whether conditions are proper for deployment of said safety restraint device.

2. An apparatus as set forth in claim 1 wherein said main sensor assembly includes at least a longitudinal sensor for generating a longitudinal sensor signal, a lateral sensor for generating a lateral sensor signal, and a vertical sensor for generating a vertical sensor signal and wherein said plurality of central vehicle characteristics signals comprises at least said longitudinal sensor signal, said lateral sensor signal, and said vertical sensor signal.

3. An apparatus as set forth in claim 2 wherein said satellite sensor assembly includes at least one front impact sensor for generating a front impact sensor signal and a plurality of side impact sensors for generating a plurality of side impact sensor signals and wherein said plurality of satellite vehicle characteristics comprises at least said front impact sensor signal and said plurality of side impact sensor signals.

4. An apparatus as set forth in claim 3 wherein said safety restraint comprises at least one front impact related safety restraint device and includes at least one primary safing actuator and at least one secondary safing actuator for deploying said front impact related safety restraint device.

5. An apparatus as set forth in claim 4 wherein said primary safing actuator comprises a transistor switch and said secondary safing actuator comprises a deployment enable signal.

6. An apparatus as set forth in claim 4 wherein in response to a front impact event, said main controller generates an arming threshold based on said longitudinal sensor signal or said front impact sensor signal and subsequently generates a safety restraint device deployment request based on said longitudinal sensor signal and said front impact sensor signal;

said safing controller generates a deployment decision for front impact related safety restraint devices based on said longitudinal sensor signal, said safing controller generating said deployment decision for front impact related safety restraint devices independently from said main controller;

said primary safing actuator and secondary safing actuator being enabled only after said deployment decision for front impact related safety restraint devices and said arming threshold have been generated; and wherein at least one of said front impact related safety restraint devices is deployed in response to said primary and secondary safing actuators being enabled in combination with said safety restraint device deployment request being generated.

7. An apparatus as set forth in claim 3 wherein said satellite sensor assembly includes at least one rear impact sensor for generating a rear impact sensor signal and wherein in response to a rear impact event, said main controller generates an arming threshold based on said longitudinal sensor signal or said rear impact sensor signal and subsequently generates a safety restraint device deployment request based on said longitudinal sensor signal and said rear impact sensor signal;

said safing controller generates a deployment decision for rear impact related safety restraint devices based on said longitudinal sensor signal, said safing controller generating said deployment decision for rear impact related safety restraint devices independently from said main controller;

said primary safing actuator and secondary safing actuator being enabled only after said deployment decision for rear impact related safety restraint devices and said arming threshold have been generated; and wherein at least one of said rear impact related safety restraint devices is deployed in response to said primary and secondary safing actuators being enabled in combination with said safety restraint device deployment request being generated.

8. An apparatus as set forth in claim 3 wherein said safety restraint comprises at least one side impact related safety restraint device and includes at least one primary safing actuator and at least one secondary safing actuator for deploying said side impact related safety restraint device.

9. An apparatus as set forth in claim 8 wherein in response to a side impact event, said main controller generates an arming threshold based on at least one of said side impact sensor signals and subsequently generates a safety restraint device deployment request based on either said longitudinal sensor signal and at least one of said side impact sensor signals, said lateral sensor signal and at least one of said side impact sensor signals, or at least two side impact sensor signals;

said safing controller generates a deployment decision for side impact related safety restraint devices based on at least one of said side impact sensor signals, said safing controller generating said deployment decision for side impact related safety restraint devices independently from said main controller;

said primary safing actuator and secondary safing actuator being enabled only after said deployment decision for side impact related safety restraint devices and said arming threshold have been generated; and wherein at least one of said side impact related safety restraint devices is deployed in response to said primary safing actuator and secondary safing actuator being enabled in combination with said safety restraint device deployment request being generated.

10. An apparatus as set forth in claim 3 wherein said main sensor assembly includes a roll angular rate sensor for generating a roll angular rate signal and wherein said safety restraint comprises at least one roll-over impact related safety restraint device with at least one primary safing actuator and at least one secondary safing actuator for deploying said roll-over impact related safety restraint device.

11. An apparatus as set forth in claim 10 wherein in response to a roll-over impact event, said main controller generates an arming threshold based on said roll angular rate sensor signal or said lateral sensor signal and subsequently generates a safety restraint device deployment request based on said roll angular rate sensor signal and said lateral sensor signal or said vertical sensor signal;

said safing controller generates a deployment decision for roll-over impact related safety restraint devices based on said roll angular rate sensor signal, said safing controller generating said deployment decision for roll-over impact related safety restraint devices independently from said main controller;

said primary safing actuator and secondary safing actuator being enabled only after said deployment decision for roll-over impact related safety restraint devices and said arming threshold have been generated; and wherein at least one of said roll-over impact related safety restraint devices is deployed in response to said primary safing actuator and secondary safing actuator being enabled in combination with said safety restraint device deployment request being generated.

12. An apparatus as set forth in claim 3 wherein said main controller determines whether to generate a fuel-cut-off signal in response to an impact event and wherein said main controller determines whether to generate said fuel cut-off signal independently from safety restraint device deployment decisions.

13. An apparatus as set forth in claim 12 wherein said main controller compares said lateral and longitudinal sensor signals to a predetermined threshold, generates said fuel cut-off signal if a sum of said lateral and longitudinal sensor signals exceeds a first static threshold.

14. An apparatus as set forth in claim 13 wherein said main controller discriminates between front, side, and rear impact events before generating said fuel cut-off signal, compares the sum of said lateral and longitudinal sensor signals to a second static threshold, lower than said first static threshold, and if said second static threshold is exceeded, determines a velocity direction of said longitudinal sensor signal and activates a fuel cut-off switch if said velocity direction indicates a rear impact event.

15. A method for determining deployment of a safety restraint device in a vehicle occupant restraining system comprising the steps of:
  (a) measuring vehicle characteristics as occurring near a central location in a vehicle body and generating a plurality of central vehicle characteristic signals;
  (b) measuring vehicle characteristics as occurring at locations in the vehicle body that are remote from the central location and generating a plurality of satellite vehicle characteristic signals;
  (c) transmitting the plurality of central vehicle characteristic signals and the plurality of satellite vehicle characteristic signals to a main controller and a safing controller;
  (d) determining whether conditions are proper for deployment of a safety restraint device in response to a vehicle impact event with the main controller; and
  (e) verifying whether conditions are proper for deployment of the safety restraint device with the safing controller.

16. A method as set forth in claim 15 wherein the main and safing controllers make safety restraint device deployment decisions independently from each other.

17. A method as set forth in claim 16 wherein step (a) further includes measuring a longitudinal vehicle characteristic and generating a longitudinal data signal, measuring a lateral vehicle characteristic and generating a lateral data signal, and measuring a vertical vehicle characteristic and generating a vertical signal; and
  wherein step (b) further includes measuring a front crash vehicle characteristic and generating a front crash data signal and measuring a plurality of side crash vehicle characteristics and generating a plurality of side crash data signals.

18. A method as set forth in claim 17 wherein in response to a front impact event, the steps (d) and (e) further include the steps of
  (1) the main controller generating an arming threshold based on the longitudinal data signal or the front crash data signal;
  (2) the main controller generating a safety restraint device deployment request based on the longitudinal data signal and the front crash data signal;
  (3) generating a deployment decision for front impact related safety restraint devices from the safing controller based on the longitudinal data signal;
  (4) enabling at least one primary safing actuator and at least one secondary safing actuator once steps (1) and (2) are completed; and
  (5) deploying at least one of the front impact related safety restraint devices when steps (3) and (4) are completed.

19. A method as set forth in claim 18 wherein step (3) always follows step (2) and wherein step (1) is independent of steps (2) and (3).

20. A method as set forth in claim 18 wherein the primary safing actuator comprises a transistor switch and the secondary safing actuator comprises a deployment enable signal.

21. A method as set forth in claim 17 wherein in response to a side impact event, the steps (d) and (e) further include the steps of
  (1) the main controller generating an arming threshold based on at least one of the side crash data signals;
  (2) the main controller generating a safety restraint device deployment request based on either at least one of the side crash data signals and the longitudinal data signal, at least one of the side crash data signals and the lateral data signal, or two side crash data signals;
  (3) generating a deployment decision for side impact related safety restraint devices from the safing controller based on the side crash data signal;
  (4) enabling at least one primary safing actuator and at least one secondary safing actuator once steps (1) and (2) are completed; and
  (5) deploying at least one of the side impact related safety restraint devices when steps (3) and (4) are completed.

22. A method as set forth in claim 21 wherein step (3) always follows step (2) and wherein step (1) is independent of steps (2) and (3).

23. A method as set forth in claim 17 wherein step (a) further includes measuring a roll angular rate characteristic and generating a roll angular rate data signal and wherein in response to a roll-over impact event, the steps (d) and (e) further include the steps of
  (1) the main controller generating an arming threshold based on the roll angular rate data signal or the lateral data signal;
  (2) the main controller generating a safety restraint device deployment request based on the roll angular rate data signal and the lateral data signal or the vertical data signal;
  (3) generating a deployment decision for roll-over impact related safety restraint devices from the safing controller based on the roll angular rate data signal;
  (4) enabling at least one primary safing actuator and at least one secondary safing actuator once steps (1) and (2) are completed; and
  (5) deploying at least one of the roll-over impact related safety restraint devices when steps (3) and (4) are completed.

24. A method as set forth in claim 23 wherein step (3) always follows step (2) and wherein step (1) is independent of steps (2) and (3).

25. A method as set forth in claim 17 wherein step (b) further includes measuring a rear crash vehicle characteristic and generating a rear crash data signal and wherein in response to a rear impact event, the steps (d) and (e) further include the steps of
   (1) the main controller generating an arming threshold based on the longitudinal data signal or the rear crash data signal;
   (2) the main controller generating a safety restraint device deployment request based on the longitudinal data signal and the rear crash data signal;
   (3) generating a deployment decision for rear impact related safety restraint devices from the safing controller based on the longitudinal data signal;
   (4) enabling at least one primary safing actuator and at least one secondary safing actuator once steps (1) and (2) are completed; and
   (5) deploying at least one of the rear impact related safety restraint devices when steps (3) and (4) are completed.

26. A method as set forth in claim 25 wherein step (3) always follows step (2) and wherein step (1) is independent of steps (2) and (3).

27. A method as set forth in claim 17 including the steps of the main controller determining whether to generate a fuel-cut-off signal in response to an impact event independently from the determination of whether safety restraint device deployment conditions are proper.

28. A method as set forth in claim 27 including the steps of the main controller comparing the lateral and longitudinal data signals to a predetermined threshold and generating the fuel cut-off signal if a sum of the lateral and longitudinal data signals exceeds a first static threshold.

29. An apparatus as set forth in claim 28 including the steps of the main controller discriminating between front, side, and rear impact events before generating the fuel cut-off signal, comparing the sum of the lateral and longitudinal data signals to a second static threshold that is lower than the first static threshold, and if the second static threshold is exceeded, determining a velocity direction of the longitudinal data signal and activating a fuel cut-off switch if the velocity direction indicates a rear impact event.

* * * * *